April 24, 1951 L. V. HARDING 2,550,148
MULTIPLE POSITION SPOOL VALVE FOR MACHINE TOOLS
Filed Oct. 6, 1944 7 Sheets-Sheet 1
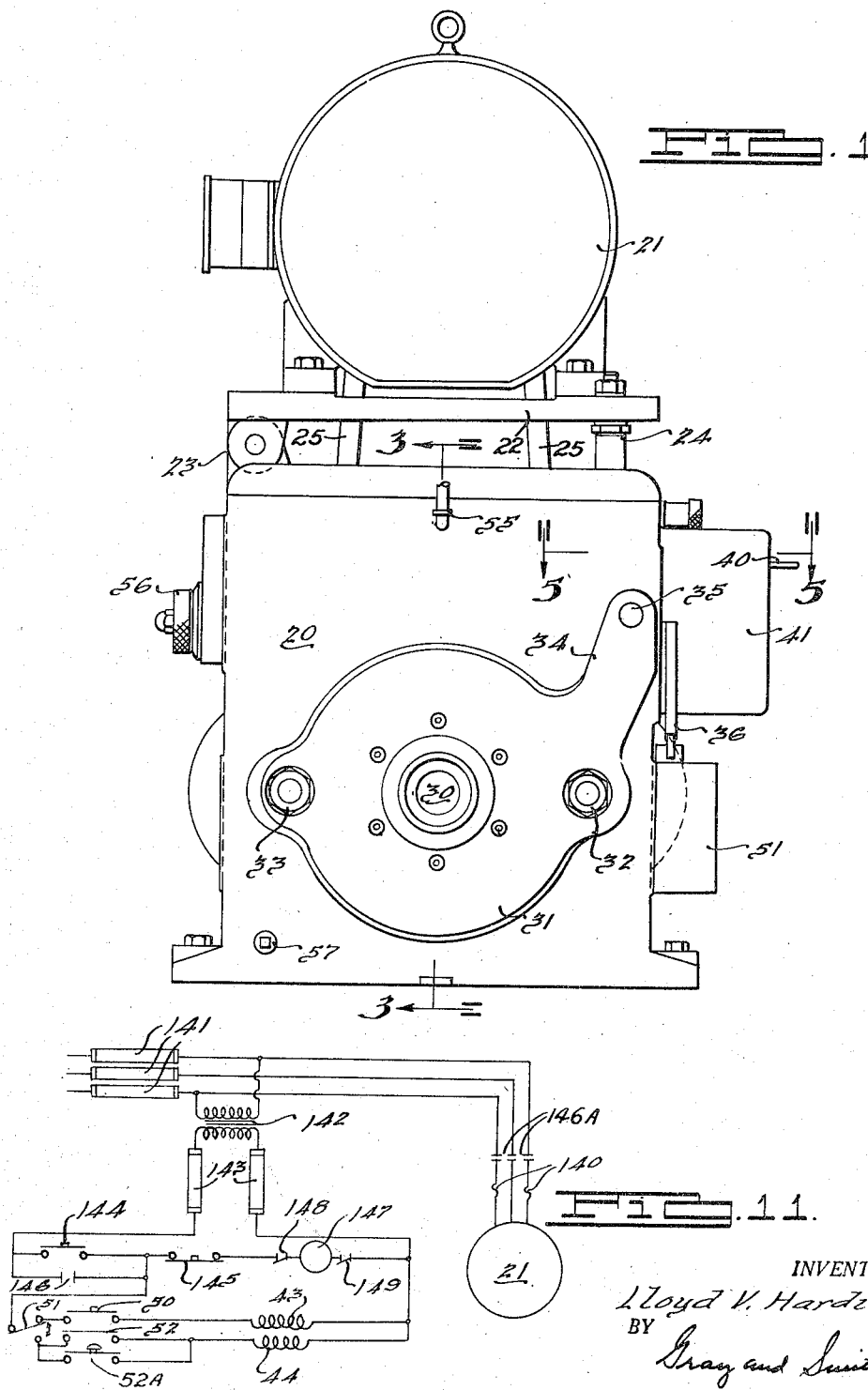

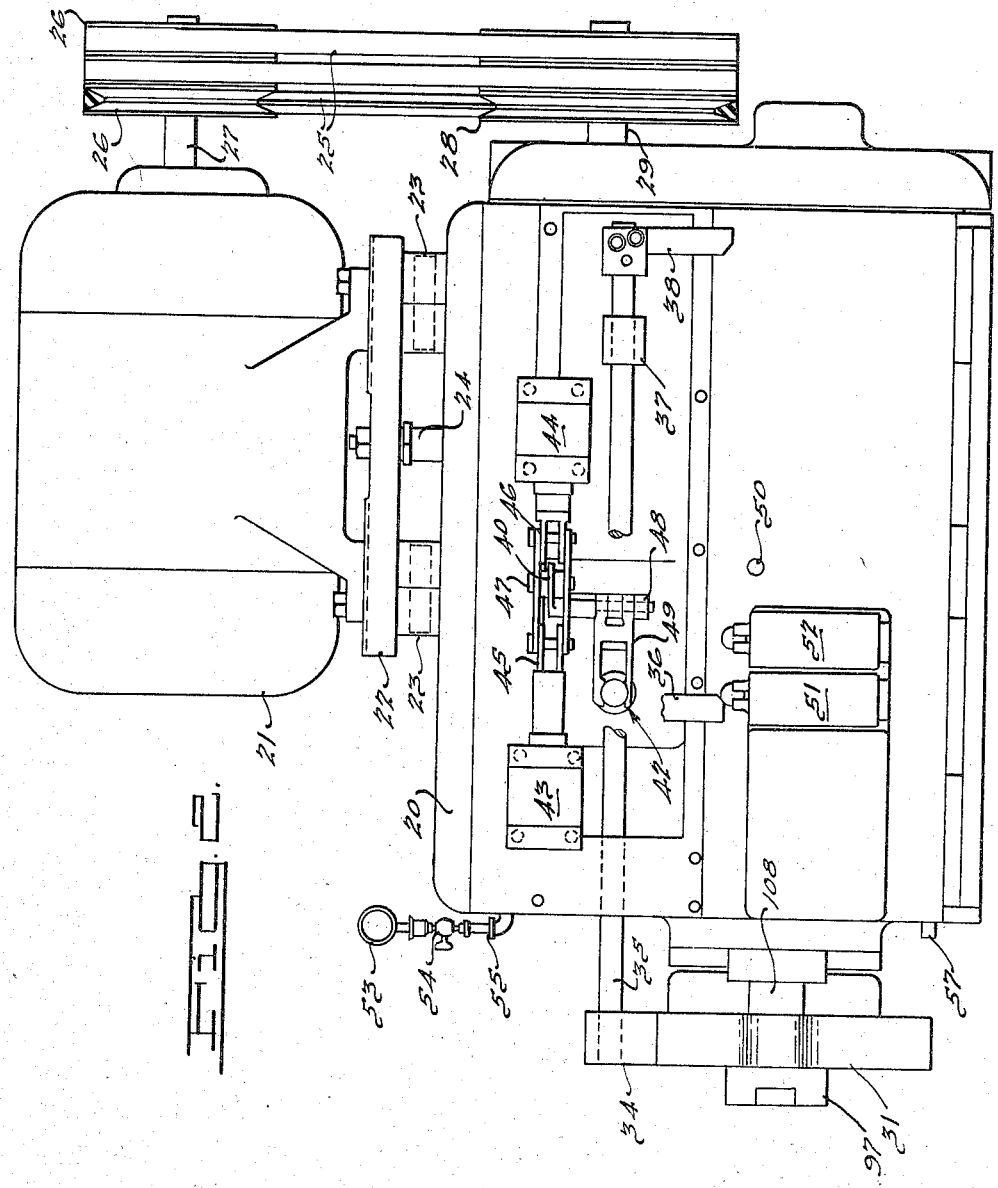

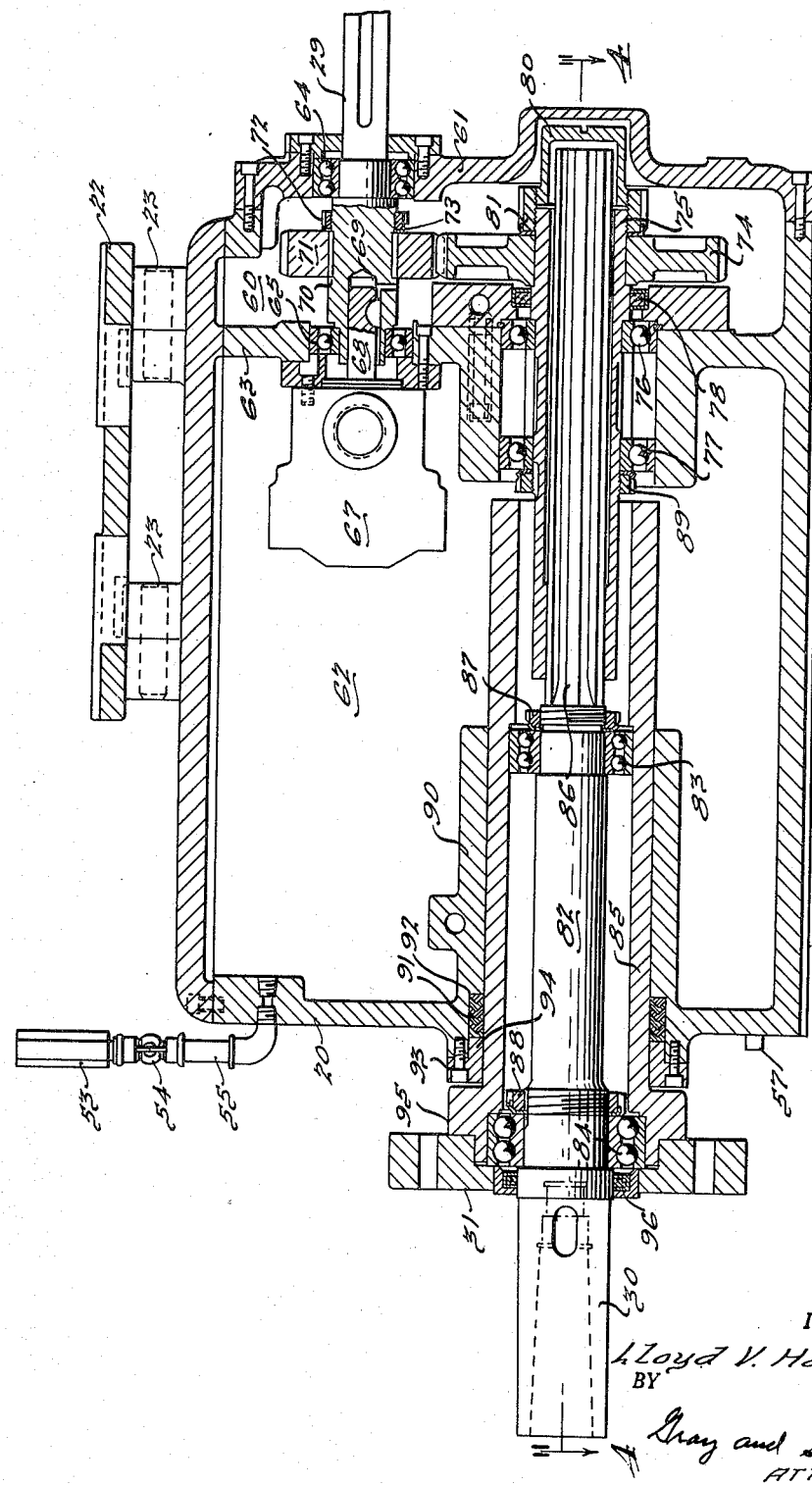

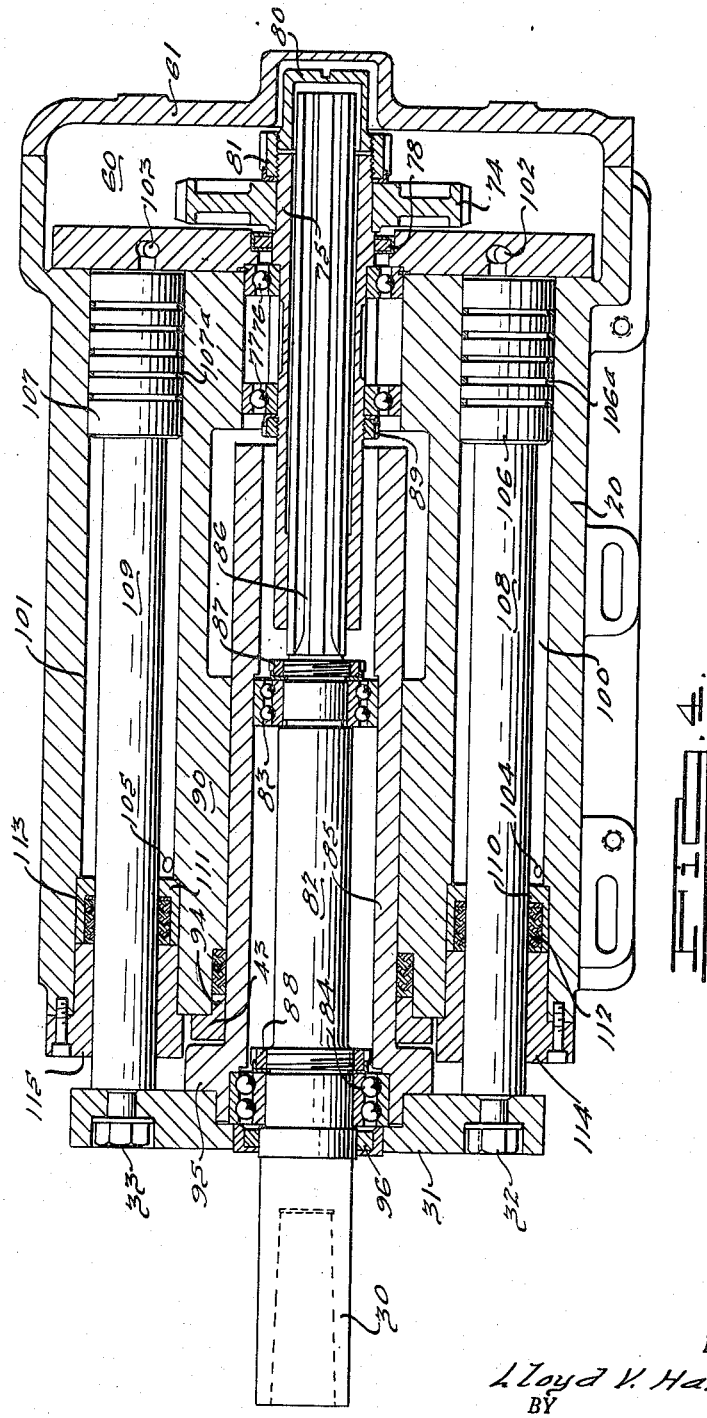

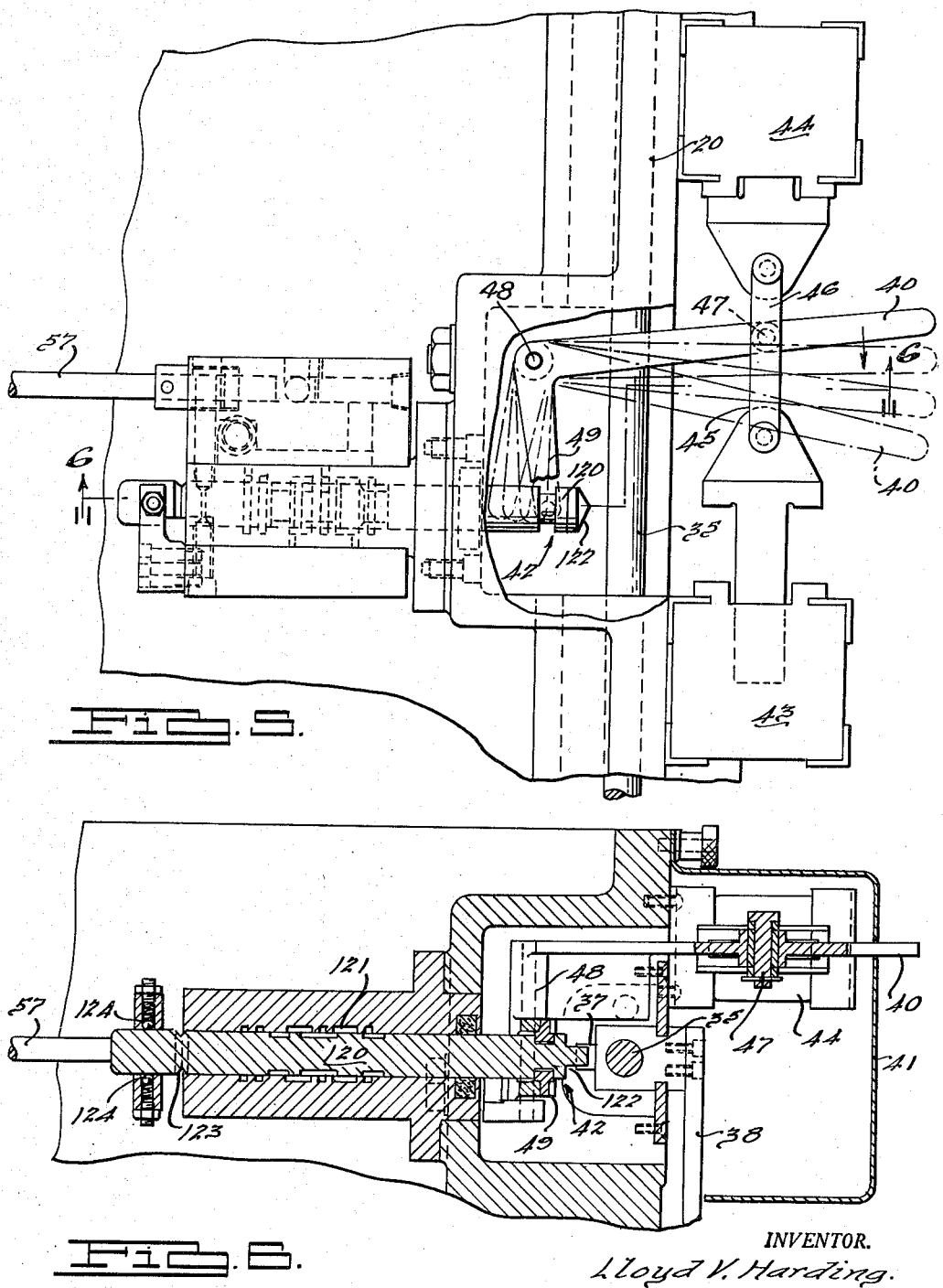

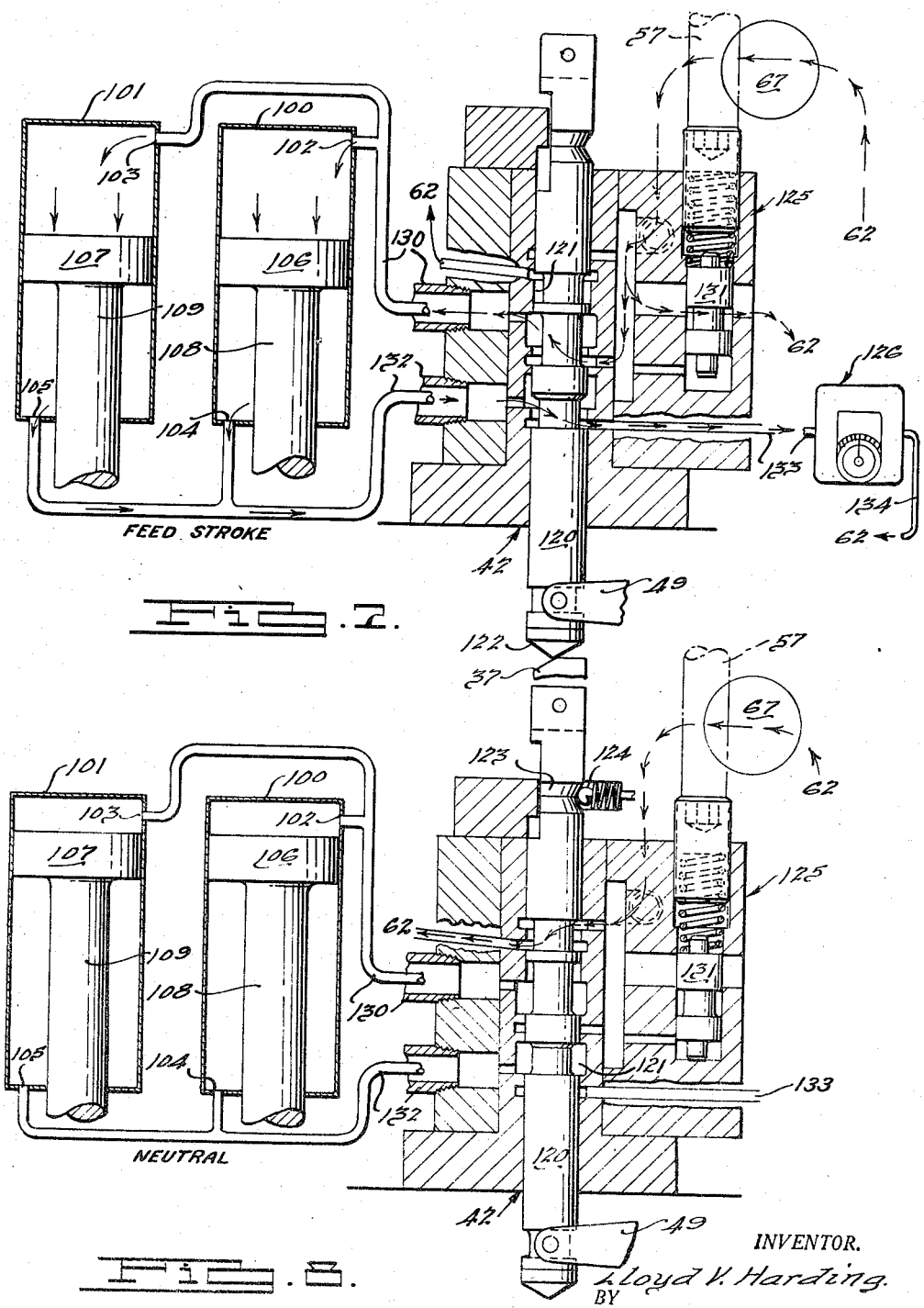

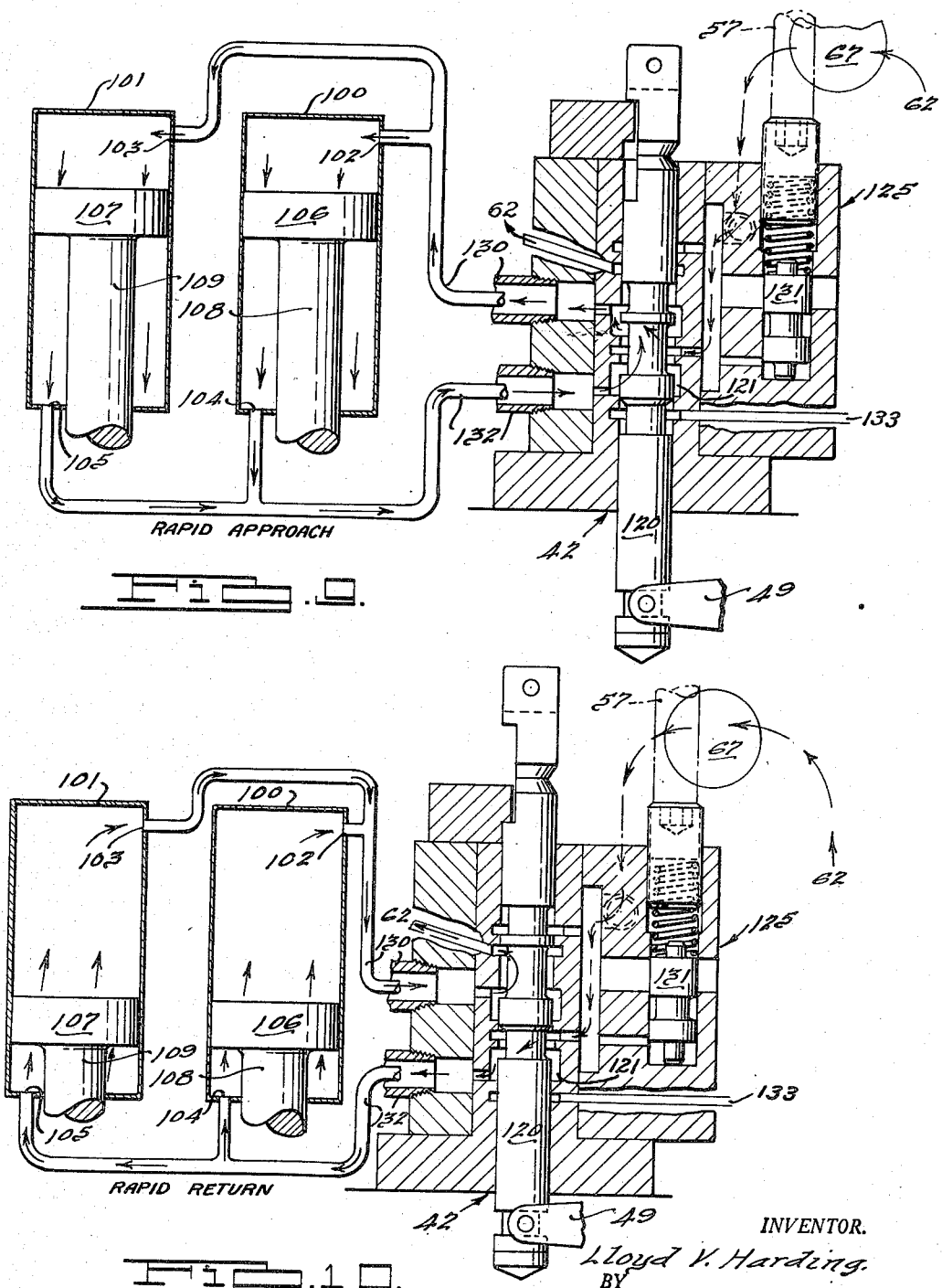

Patented Apr. 24, 1951

2,550,148

UNITED STATES PATENT OFFICE 2,550,148

MULTIPLE POSITION SPOOL VALVE FOR MACHINE TOOLS

Lloyd V. Harding, Detroit, Mich., assignor to Le Maire Tool & Manufacturing Company, Dearborn, Mich., a corporation of Michigan Application October 6, 1944, Serial No. 557,521

3 Claims. (Cl. 251—76)

The present invention relates to a machine tool and more particularly to a self-contained hydraulically actuated unit in which a mechanically driven rotatable spindle is reciprocated relative to a work piece. Such tools may be used to perform various machine tool operations, such for example as single or multiple spindle drilling, reaming, boring, counter-boring, spot facing and the like or similar operations. A machine tool embodying the present invention is adapted to provide an automatically controlled basic operating cycle which includes a rapid approach, feed, and rapid return of the tool relative to the work piece. The basic operating cycle may, if desired, be modified to provide a dwell after feed and prior to the rapid return of the tool spindle. Also, if desired, the basic operating cycle may be readily modified to provide a rapid approach, feed, second rapid approach, then second feed, and a rapid return, as for example when used to perform machine operations on spaced parts of a work piece.

A principal object of the present invention is to provide a self-contained hydraulically actuated machine tool in which a power driven rotating spindle is reciprocated relative to a work piece by a plurality of hydraulically actuated rams which are supplied with hydraulic fluid under pressure through a novel hydraulic circuit controlled by automatically actuated hydraulic control valves which determine the operating cycles of the unit.

Another object of the present invention is to provide a self-contained hydraulically actuated machine tool in which a power driven rotating spindle is reciprocated relative to a work piece by hydraulically actuated power means actuated through a novel hydraulic circuit and controlled by adjustable control members for automatically controlling the operating cycle of the said tool.

It is a further object of the present invention to provide a self-contained hydraulically actuated machine tool which may be operated in horizontal, vertical or angular planes and in which a mechanically driven rotatable spindle is reciprocated relative to a work piece by a plurality of hydraulically actuated cylinders connected in an automatically controlled hydraulic circuit of novel design to provide a highly efficient machine tool of compact construction.

It is another object of the present invention to provide a self-contained hydraulically actuated machine tool having an automatically controlled operating cycle including a rapid approach, feed, and rapid return of the power driven rotating spindle relative to a work piece, the tool being of a simplified and compact design which is positive and efficient in operation and which, when set up, requires a minimum of service and adjustment by the operator.

Other objects of the present invention will appear in the following description and appended claims, reference being had to the accompanying drawings forming a part of this specification wherein like reference characters designate corresponding parts in the several views.

In the drawings:

Fig. 1 is a front elevation of a machine tool embodying the present invention looking toward the reciprocating spindle.

Fig. 2 is an elevation with parts broken away showing the right hand side of the tool shown in Fig. 1.

Fig. 3 is a vertical section taken substantially on the line 3—3 of Fig. 1 looking in the direction of the arrows.

Fig. 4 is a lateral section taken substantially on the line 4—4 of Fig. 3 looking in the direction of the arrows.

Fig. 5 is an enlarged plan view with parts broken away showing a portion of the control mechanism, the view being taken substantially on the line 5—5 of Fig. 1 looking in the direction of the arrows.

Fig. 6 is a sectional view taken along the staggered section line 6—6 of Fig. 5 looking in the direction of the arrows.

Figs. 7, 8, 9 and 10 are diagrammatic sectional views showing the hydraulic circuit, actuating cylinder and control valve in their respective positions during the feed, neutral, rapid approach and rapid return cycles of the spindle respectively.

Fig. 11 is a wiring diagram showing the electrical circuit and control utilized in a machine tool embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 and 2 of the drawing, a machine tool embodying the present invention comprises a main body casing 20 on which the drive motor 21 is mounted. An adjustable motor mount 22 is pivotally connected to the casing 20 by a plurality of pivotal hinge members 23. The adjustable motor mount 22 is raised and lowered relative to the main body casing by a motor mount adjustment 24 which, by raising and lowering the motor mount 22, provides the proper tension at all times on the plurality of V drive belts 25 which are driven by a plurality of drive sheaves 26 secured on the motor drive shaft 27. The belts 25 transmit driving force to a plurality of driven sheaves 28 secured on the machine drive shaft 29. By varying the ratios between the driving sheaves 26 and the driven sheaves 28, the operational speed of the shaft 29 may be varied. The motor mount 24 is sufficient to compensate for the normal range of variations in sizes of the sheaves utilized to permit the proper adjustment of the motor mount and thus secure proper tension on the drive belts 25.

A reciprocating tool spindle 30 is moved longitudinally of the machine by a cross-head 31 having connections 32 and 33 with hydraulically actuated power cylinders. (Not shown in Figs. 1 and 2 but more fully disclosed hereinafter.) A generally tangential arm 34 is secured to the cross head 31 and carries a longitudinally reciprocating control shaft 35 having control dogs 36, 37, and 38 adjustably mounted for longitudinal adjustment thereon. The function of the control dogs 36, 37 and 38 and of the longitudinal reciprocating control shaft 35 will be hereinafter more fully described.

A manual operating lever 40 for the control valve extends beyond the control valve housing 41 and permits manual operation or adjustment by the operator of the four-way control valve 42, the construction and operation of which will be hereinafter more fully described.

Electro-magnetic solenoids 43 and 44 are mounted, one on each side of the manual operating lever 40 of the four-way control valve 42, and are connected respectively by links 45 and 46 with the said manual operating lever 40 to cause the lever to pivot about the pivot point 48. Movement of the manual operating lever 40, either manually or by actuation of the solenoids 43 or 44, is transmitted to an integral valve spool operating fork 49. The lever 40 and the operating fork 49 thus constitute a rotatable crank arm.

A manual cycle start button 50 and limit switches 51 and 52 are mounted on the side of the casing 20.

An oil pressure gauge 53 is suitably connected with a cut-off valve 54 and a conduit 55 with the oil pressure system inside the unit and shows the operator instantly the pressures on the hydraulic fluid.

A flow control valve adjusting member 56 and a relief valve adjusting member 57 are provided outside the casing 20 to permit ready adjustment of the respective valve members from outside the casing 20 by the operator if and when required.

Figs. 3 and 4 show the interior of the casing 20 and illustrate the mechanism for rotating and reciprocating the spindle 30. As here shown, the casing 20 encloses a gear chamber 60 to which access may be had through a removable gear chamber cover 61. The gear chamber 60 is separated from the hydraulic sump chamber 62 by an internal web 63 integral with the casing 60.

The machine drive shaft 29 is journaled in bearings 64 mounted in the removable gear chamber cover 61, and in bearings 65 which are carried by the internal web 63.

A constant volume hydraulic pressure pump 67 of any suitable design and construction is mounted on the web 63 and extends into the hydraulic sump chamber 62. The drive shaft 68 of the pump 67 is keyed into a recess 69 in the end of the machine drive shaft 29 as shown.

The machine drive shaft 29 is provided with a shoulder 70 against which abuts one face of a main drive gear 71. The main drive gear 71 is splined on the shaft 69 and is removably maintained thereon by a gear mounting nut 72 and a gear mounting washer 73.

The teeth of the main drive gear 71 mesh with the teeth of the spindle drive gear 74 which is splined on a female splined spindle drive housing 75 which is rotatably journaled in bearings 76 and 77 carried by a portion of the web 63. An oil seal 78 extends around the housing 75 and prevents leakage of hydraulic fluid from the sump chamber 62 into the gear chamber 60. The gear chamber 60 is filled with any suitable grade of gear lubricant and this also is prevented by the oil seal from seeping into the hydraulic fluid sump 62. The relative speed of the machine drive shaft 29 and the oil pump 67 and of the spindle 30 are controlled by the gear ratios of the gears 71 and 74. Both gears are readily accessible when the removable gear housing cover 61 is removed. A cap 80 and a gear nut 81 may be removed from the end of the splined housing 75 to permit ready removal of the gear 74. By substituting various gears for the gears 71 and 74, any desired gear ratio may be provided.

The spindle 30 is mounted on a spindle drive shaft 82 which is journaled in bearings 83 and 84 carried in the reciprocating spindle housing 85. The spindle drive shaft 82 is provided with a male splined end 86 which telescopes within the female splined portion of the spline member 75. Bearing take-up adjustment nuts 87, 88 are screw threaded on the shaft 82 and prevent end play of the bearings 83 and 84 respectively. A bearing take-up adjustment nut 89 is screw threaded on the spline member 75 and prevents end play of the bearing 77.

The reciprocating spindle housing 85 is mounted in a spindle housing guide 90 formed integrally inside the casing 20. An oil seal packing 91 is held in a recess 92 in the housing 20 and is maintained in fluid tight relation therein by a removable plate 93 having an oil seal packing flange 94. This construction prevents leakage of hydraulic fluid through the casing 20 from the hydraulic sump 62 upon reciprocation of the spindle housing 85.

The reciprocating spindle housing 85 is provided with an enlarged head 95 to which the cross-head 31 is secured. An oil seal 96 surrounds the spindle 30 and is carried in the cross-head 31 to prevent the seepage of oil through the bearings 84.

The spindle 30 here shown is a standard Morse taper spindle but it is to be understood that any other suitable type of spindle may be used if desired. For example, such a spindle may be replaced by a spindle such as that shown in Fig. 2 and indicated by the numeral 97, which is the type of spindle recommended when a machine tool of the present invention is intended for use with multiple drill heads. In either instance a suitable tool holder or tool holders (not shown) are to be employed with the spindle here shown. Since such tool holders are of conventional design and construction they are, for the sake of clarity omitted from the drawings herein.

Hydraulic power to effect reciprocation of the spindle 30 is applied to the cross-head 31 and transmitted through it to the spindle shaft housing 85. Uniform pressures are exerted in a straight line behind the cross-head 31 and twist, chatter and vibration of the spindle 30 and the housing 85 during the reciprocating movement thereof are eliminated by providing a plurality of hydraulic pressure cylinders, in the present instance two, connected to the cross-head 31 at points 32 and 33 on the opposite sides of the spindle 30. It is to be understood, however, that any desired number greater than two of such cylinders may be employed if desired. In any such case a plurality of cylinders will be connected at a plurality of points preferably spaced equally about the circumference of the spindle 30.

The hydraulic pressure cylinders here shown comprise cylinder chambers 100 and 101 formed in the main housing 20. The cylinder chambers are provided respectively with inlet ports 102 and 103, and exhaust ports 104 and 105 to permit the flow of hydraulic fluid to and from the cylinder chambers 100 and 101. Pistons 106 and 107, having a plurality of piston rings 106a and 107a thereon respectively are reciprocally mounted in the chambers 100 and 101 respectively, between the said inlet and exhaust ports. The pistons are moved in said chambers in either direction longitudinally thereof depending upon the direction of flow of hydraulic pressure fluid. The pistons 106 and 107 are connected respectively with connecting rods 108 and 109, having their other ends connected to the cross-head 31 at the points 32 and 33 respectively. While any preferred sizes may be employed, the connecting rods 108 and 109 here shown each have a diameter of approximately one-half that of the piston to which they are connected. This effects a reduction of approximately fifty per cent in the fluid capacities of that portion of the cylinder chamber through which the rods pass. In other words, the fluid capacity of the cylinder chamber between the intake ports and the heads of the pistons is approximately twice the fluid capacity of the chamber between the exhaust ports and the skirt of the pistons. By suitable changes in the diameters of the connecting rods, the ratio of fluid capacity in the two parts of the cylinder chambers may be varied as desired.

The exhaust ends of the cylinder chambers 100 and 101 are closed by caps 110 and 111, respectively. Oil seals 112 and 113 are retained in the caps 110 and 111, respectively, and contact the sides of the connecting rods 108 and 109, respectively, to prevent seepage of hydraulic fluid around the said rods during the reciprocation thereof. Removable packing flange members 114 and 115 are mounted on the base portion of the main casing 20 and contact the oil seals 112 and 113, respectively.

The complete operating cycle of the tool here shown consists of a reciprocal movement of the rotating spindle from a neutral position to provide a rapid approach stroke, a feed stroke and a rapid return stroke to the neutral position. It is intended that a tool of the present invention will operate automatically throughout the cycle, but if desired, as for example on special work, or when there has been a failure of the automatic control mechanism, the machine may be controlled throughout the various phases of its operating cycle by manual adjustment of the four-way control valve 42 by the manual control lever 40. The reciprocation of the spindle 30 through its operating cycle is controlled by the hydraulic circuit, control valve and electrical control mechanism shown in Figs. 5 to 11, inclusive.

Referring to Figs. 5 and 6, the construction and operation of the four-way control valve 42 is shown. The control valve as here shown comprises a reciprocating spool 120, movable in a valve chamber or manifold 121, and having ports communicating respectively with the pump 67, the inlet ports 102 and 103, the exhaust ports 104 and 105, and the cylinder chambers 100 and 101, and with the sump 62, as will be more fully described in connection with Figs. 7 to 10, inclusive.

The spool 120 is provided at one end with a cam faced head 122 adapted to be contacted by a cam 37 carried on the shaft 35. At the other end, the spool 120 is provided with a circumferential groove 123, which is engaged by a plurality of spring pressed ball check members 124 upon movement of the spool 120 to its neutral position. This assures accurate seating of the spool 120 in the neutral position and prevents any possible longitudinal movement of the tool spindle 30 while the parts are in the neutral position.

The hydraulic circuit in the various positions of the spool 120 to effect respectively the feed, neutral, rapid approach and rapid return operations of the spindle is shown diagrammatically in Figs. 7 to 10 inclusive.

Feed cycle

The feed cycle shown in Fig. 7 utilizes the entire hydraulic circuit which includes in addition to the parts previously described, a relief valve 125 which is adjusted from outside the casing 20 by the adjustment shaft 57, and a metering flow control valve 126, which is adjusted from outside the casing 20 by the flow control adjustment member 56. The relief valve 125 is of a conventional spring loaded type and the metering flow control valve 126 is of a conventional metering orifice type. Since both the valves 125 and 126 are well known conventional constructions, they are not here shown or described in detail.

As shown by the arrows in Fig. 7, when the spool 120 is moved to its feed position as there shown, by contact of the feed cam 37 with the cam faced head 122 of the spool 120, the hydraulic pressure fluid is withdrawn from the sump 62 by the pump 67, and passes through the ports of the valve manifold 121 and around the spool 120 to the hydraulic feed line 130, supplying the intake ports 102 and 103 of the cylinder chambers 100 and 101. Due to the relatively restricted amount of hydraulic fluid required during the feed operation, the pressures created in the hydraulic fluid move the spool 131 of the spring pressed relief valve 125 and the excess hydraulic feed fluid is by-passed directly through the relief valve 125 to the sump 62. As the pistons 106 and 107 are moved in the direction of the arrows, the hydraulic fluid from the exhaust ports 104 and 105 flows through the exhaust line 132 and through the manifold 121 and around the spool 120 and is discharged through a line 133 leading to the metering flow control valve 126. The rate of speed therethrough is determined by the adjustment of the metering flow control valve 126 which determines how rapidly the exhaust fluid is returned through the discharge conduit 134 to the sump 62, and consequently the amount of back pressure in the cylinder chambers opposing the movement of the pistons 106 and 107 therein.

Neutral position

When the spool 120 is moved to the neutral position as shown in Fig. 8, the spring pressed ball 124 drops into the circumferential groove 123 and holds the spool 120 against unintended movement. When in this position, the entire flow of hydraulic fluid is by-passed to the sump 62 as indicated by the arrows. In the normal cycle, the neutral position follows the rapid return cycle and precedes the rapid approach cycle. If a dwell is desired in the operating cycle, a suitable control member may be provided to move the spool into neutral position immediately following the feed cycle and immediately preceding the rapid return cycle.

Rapid approach and rapid return cycle

The rapid approach and rapid return cycles are shown in Figs. 9 and 10 and are provided for the purpose of speeding up the operating cycle of the machine tool by cutting down the time interval required for movement of the reciprocating tool spindle 30 to and from the feed position. When the spool 120 is moved to the position shown in Fig. 9, the rapid approach cycle is established. Due to the fact that the pump 67 is a constant volume, constant feed pump, if its size is selected as adequate for all other needs of the operating cycle, it does not pass a sufficient volume of fluid to effect the rapid advance. In previous constructions attempts have been made to supply sufficient fluid to effect a rapid advance of the spindle either by increasing the capacity of the pump 67, as by using over-sized pumps, or by providing a variable capacity pump. Such expedients increase the cost of the pump or increase the size of the entire machine and have not been wholly satisfactory. To supply the required volume of hydraulic pressure fluid in the given time interval to effect the rapid approach, hydraulic pressure fluid from the exhaust ports 104 and 105 passes through the exhaust fluid conduit 132 and through the valve manifold 125, and around the spool 120, to the feed duct line 130. To illustrate this operation, by way of example, if it is assumed that each of the cylinders 100 and 101 requires one volume of fluid during the feed cycle, a pump of sufficient capacity to handle the feed cycle would have a total volume of two. To effect the rapid approach it may be assumed that each cylinder would require one and one-half volumes of fluid or a total of three volumes. By providing a pump having a capacity of two, which is sufficient for the feed cycle, it will be seen that the pump would be of insufficient capacity to provide the required three volumes for the rapid approach cycle. Since each connecting rod 108 and 109, is in the present instance, approximately one-half the diameter of the piston to which it is connected, the capacity of the cylinder chamber through which such rod passes is reduced by approximately one-half. Therefore, by passing one-half volume of fluid from the exhaust end of each cylinder to the feed ends thereof, there are provided a total of three volumes of hydraulic fluid under pressure. The three volumes thus made available are sufficient to carry out the rapid approach cycle without requiring an increase in size or the capacity of the pump. Since the fluid is discharged from the ports 104 and 105 by the pressure induced movement of the pistons 106 and 107, the discharge fluid is under pressure and this, when combined with the pressure fluids from the pump 67, augments the available supply of pressure fluid and increases the amount of pressure fluid available at a given time to carry out the rapid approach cycle.

In the rapid return cycle as shown in Fig. 10, the spool 120 is moved to the position shown in which the entire volume of hydraulic pressure fluid from the pump 67 is supplied to the conduit 132 and is fed into the cylinder chambers 100 and 101 through the exhaust ports 104 and 105. Since the volume of each of these chambers is reduced by approximately one-half by the connecting rods 108 and 109, there is available a sufficient volume of hydraulic pressure fluid from the pump 67 to effect the rapid return of the spindle. The excess fluid on the opposite sides of the pistons is discharged through the conduit 130 and the valve chamber 121 to the sump 62.

Machine control

The machine tool herein disclosed is controlled in its operation through the electrical circuit shown diagrammatically in Fig. 11 and which includes the cycle start switch 50, the limit switches 51 and 52, and the valve solenoids 43 and 44. The motor 21 is connected through over-load relays 140 and over-load fuses 141, with an electrical power source. The control mechanism is supplied with electrical energy from the motor supplying circuit through a control transformer 142 which is connected with fuses 143 and with the motor start switch 144, and a motor stop switch 145.

A normally open relay switch 146 is connected in parallel with the motor start switch 144 and is closed by energizing the holding coil 147, which also energizes the normally open relay switches 146A in the circuit for the motor 21. Over-load relays 148 and 149 are connected in series with the motor stop switch 145 and the holding coil 147.

The cycle start switch 50 and the motor start switch 144 and motor stop switch 145 are manually actuated. The limit switches 51 and 52 are actuated by the control dogs 36 and 38 respectively, carried on the control shaft 35. The electric circuit as shown is such that the limit switch 51 must be closed, as shown, through the circuit including switch 50 and coil 43 before closing the cycle start switch 50 will be effective. The limit switch 51 is closed (moved to its upper position in Fig. 11) by the conrol dog 36 when the spindle is retracted and the machine is in the neutral position. In this position, actuation of the cycle start switch 50 actuates the solenoid 43 to move the spool 120 into the rapid approach position shown in Fig. 9. If the limit switch 51 is not closed by the dog 36 upon the complete retraction of the spindle, the rapid approach cycle cannot be established. This is an important factor since it prevents unintended establishment of the rapid approach cycle such as might otherwise occur. If for example, the spindle was in the feed position when the cycle start switch 50 is actuated and the rapid advance cycle was thus established the machine would cause excessive tool breakage or wear due to excessive feed pressures or the pressures might be such that the machine would be stalled. By this provision, the cycle start switch is rendered inoperative until the spindle is fully retracted and the parts occupy their neutral positions shown in Fig. 8.

Upon actuation of the cycle start switch 50, the solenoid 43 is momentarily energized to move the spool 120 to the rapid approach position as shown in Fig. 9. The rapid approach stroke is thus hydraulically actuated and continues until the dog 37 on the shaft 35 contacts the cam faced head 122 of the spool 120, and moves the spool 120 into the feed position shown in Fig. 7. As soon as the dog 36 rides off the limit switch 51, the latter pivots to its downward position, as indicated by the arrow in Fig. 11, to close the circuit between the now closed relay switch 146 and the open limit switch 52. The coil 43 is thus deenergized almost immediately after the spool 120 moves to the rapid approach position, but this in no way alters the position of the spool 120. The spool 120 is held in the feed position for a predetermined time interval until the dog 38 on the shaft 35 closes the limit switch 52, completing the circuit through switch 146, switch 51 in the down position, and the solenoid 44 which latter moves the spool 120 to its rapid return position as shown in Fig. 10. The manually operated return stroke switch 52A is provided in parallel with the limit switch 52 to permit the return stroke to be actuated at any time that the dog 36 is not holding the switch 51 in the raised position shown in Fig. 11.

From the foregoing it will be seen that a machine tool of novel operating characteristics has been provided and which may be operated either automatically as described, or by manual operation of the various switches and the control valve mechanism. The spindle 30 is at all times driven by a mechanical connection with the motor so as to be rotated at a predetermined contact speed. The reciprocating transverse movement of the spindle is effected by the hydraulic cylinders and is controlled by the hydraulic circuit herein disclosed. A novel feature of the circuit is the provision of the four-way valve which permits the hydraulic pressure fluid supplied by the pump to be augmented by the hydraulic pressure fluid taken from the exhaust ends of the cylinder in order to effect a rapid advance or approach of the spindle to the work piece with a pump selected for the capacities required during the feed cycle.

I claim:

1. In a hydraulic control mechanism, a four position compartmental valve having two mating recessed valve elements selectively movable reciprocally relative to each other, a plurality of lands provided by each of said elements and partitioning said recesses into a plurality of compartments spaced side by side in the direction of the relative reciprocal movement of said two elements, six ports, one of each communicating with one of each of six of said compartments and including two inlet ports, two discharge ports, and two operating ports, said compartments being selectively interconnected by relative movement of said elements to connect one of said inlet ports with both of said operating ports, or to connect either of said operating ports with one of said inlet ports and simultaneously to connect the other operating port with one of said discharge ports, or to connect one of said inlet ports with one of said discharge ports while simultaneously closing each of said operating ports from any other ports, said first valve element is stationary and is partitioned into six stationary compartments by five stationary lands, said six ports communicate with said six stationary compartments, the ports to the first and fourth stationary compartments, numbered consecutively, being said two inlet ports, the second and sixth ports being said two discharge ports, the third and fifth ports being said two operating ports, the second valve element is reciprocally movable and is partitioned into three moving compartments by two moving lands; in the first position of said valve the outer edge of the first moving compartment abuts the second stationary land so as to isolate each of the first and second stationary compartments from the other stationary compartments, the first moving land lies between the edges of the third stationary compartment to permit communication between the third and fourth stationary compartments, the outer edge of the second moving land abuts the fifth stationary land so as to isolate the sixth stationary compartment from the other stationary compartments, and the other edge of the second moving land lies between the edges of the fifth stationary compartment to permit communication between the fourth and fifth stationary compartments; in the second position of said valve, the first moving land abuts the first stationary land and isolates the first stationary compartment from the other stationary compartments, the secondary stationary land lies between the edges of the second moving compartment to permit communication between the second and third stationary compartments, the second moving land abuts the third stationary land so as to prevent communication between the third and fourth stationary compartments, the third moving compartment extends on either side beyond the edges of the fourth stationary land to permit communication between the fourth and fifth stationary compartments, and the outer edge of the third moving compartment lies between the edges of the fifth stationary compartment so as to isolate the sixth stationary compartment from all the other stationary compartments; in the third position of the valve, the outer edge of the first moving compartment lies between the edges of the second stationary compartment so as to isolate the first stationary compartment from all the other stationary compartments, the first moving land abuts the second stationary land and isolates the second stationary compartment from all the other stationary compartments, one edge of the second moving land abuts the fourth stationary land so as to separate the fourth and fifth compartments from each other, and the fifth stationary land lies between the edges of the third moving compartment to permit communication between the fifth and sixth stationary compartments; and in the fourth position of the valve, the first stationary land lies between the edges of the first moving compartment to permit communication between the first and second stationary compartments, the first moving land abuts the edges of the second stationary land to separate the second and third stationary compartments from each other, the second moving land abuts both the third and fourth stationary lands so as to close the fourth stationary compartment from the other stationary compartments, and the outer edge of the third moving compartment abuts the fifth stationary land so as to separate each of the fifth and sixth stationary compartments from each other.

2. In a hydraulic control adapted to operate a reciprocating differential area hydraulically actuated piston movable within a piston cylinder and including a constant volume fluid pressure source and a fluid sump, a novel valve comprising a valve cylinder and a spool axially slidable therein, said valve cylinder having a plurality of axially spaced fluid ports including a first inlet port adapted for connection with the fluid pressure source, a first outlet port adapted for connection with the sump, a first feed duct port adapted for connection with the piston cylinder at the end having the larger piston area, a second inlet port adapted for connection with the fluid pressure source, a second feed duct port adapted for connection with the opposite end of the piston cylinder and a second outlet port adapted for connection with the sump, said ports being positioned in the order named, and said spool having four axially spaced land portions to control fluid communication between said ports, said spool being movable within said valve cylinder to a rapid feed position wherein the first of said land portions closes said first inlet and said first outlet ports and the third land portion closes said second outlet port and wherein said land portions permit fluid communication between both of said feed duct ports and said second inlet port, said spool also being movable within said valve cylinder to a slow feed position wherein said first land portion closes said first inlet port, said second land portion closes communication between said first outlet port and said first feed duct port and said third land portion closes communication between said second inlet port and said second feed duct port and whereby said land portions permit communication between said second inlet port and said first feed duct port and between said second feed duct port and said second outlet port, said spool also being movable within said valve cylinder to a neutral position wherein said second land portion closes communication between said first feed duct port and said first outlet port, said third land portion closing communication between said first feed duct port, said second inlet port and said second feed duct port and said fourth land portion closing communication between said second feed duct port and said second outlet port, and wherein said land portions permit communication between said first inlet port and said first outlet port, said spool also being movable to a rapid return position wherein said second land portion closes communication between said first inlet port and said first outlet port, said third land portion closes communication between said second inlet port and said first feed duct port and said fourth land portion closes communication between said second feed duct port and said second outlet port and wherein said land portions permit communication between said first outlet port and said first feed duct port and also between said second inlet port and said second feed duct port.

3. In a hydraulic control adapted to operate a reciprocating differential area hydraulically actuated piston movable within a piston cylinder and including a constant volume fluid pressure source and a fluid sump, a novel valve comprising a valve cylinder and a spool axially slidable therein, said valve cylinder having a plurality of axially spaced fluid ports including a first inlet port adapted for connection with the fluid pressure source, a first outlet port adapted for connection with the sump, a first feed duct port adapted for connection with the piston cylinder at the end having the larger piston area, a second inlet port adapted for connection with the fluid pressure source, a second feed duct port adapted for connection with the opposite end of the piston cylinder and a second outlet port adapted for connection with the sump, said ports being positioned in the order named, said cylinder also having land portions between each of said ports, and said spool having four axially spaced land portions cooperating with the land portions of said valve cylinder to control fluid communication between said ports, said spool being movable within said valve cylinder to a rapid feed position wherein the first of said spool land portions closes said first inlet and said first outlet ports and the third land portion closes said second outlet port and wherein said spool land portions permit fluid communication between both of said feed duct ports and said second inlet port, said spool also being movable within said valve cylinder to a slow feed position wherein said first spool land portion closes said first inlet port, said second spool land portion closes communication between said first outlet port and said first feed duct port and said third spool land portion closes communication between said second inlet port and said second feed duct port and whereby said spool land portions permit communication between said second inlet port and said first feed duct port and between said second feed duct port and said second outlet port, said spool also being movable within said valve cylinder to a neutral position wherein said second spool land portion closes communication between said first feed duct port and said first outlet port, said third spool land portion closing communication between said first feed duct port, said second inlet port and said second feed duct port and said fourth spool land portion closing communication between said second feed duct port and said second outlet port, and wherein said spool land portions permit communication between said first inlet port and said first outlet port, said spool also being movable to a rapid return position wherein said second spool land portion closes communication between said first inlet port and said first outlet port, said third spool land portion closes communication between said second inlet port and said first feed duct port and said fourth spool land portion closes communication between said second feed duct port and said second outlet port and wherein said spool land portions permit communication between said first outlet port and said first feed duct port and also between said second inlet port and said second feed duct port.

LLOYD V. HARDING.

REFERENCES CITED

The following references are of record in the file of this patent:

UNITED STATES PATENTS

| Number | Name | Date |
|---|---|---|
| 1,147,820 | Scott | July 27, 1915 |
| 1,787,781 | Galloway | Jan. 6, 1931 |
| 1,909,166 | Burrell | May 16, 1933 |
| 1,999,248 | Melling | Apr. 20, 1935 |
| 2,016,654 | Shippy et al. | Oct. 8, 1935 |
| 2,036,162 | Svenson | Mar. 31, 1936 |
| 2,051,052 | Morgan | Aug. 18, 1936 |
| 2,111,689 | West | Mar. 22, 1938 |
| 2,160,217 | Kingsbury | May 30, 1939 |
| 2,167,106 | Dunham et al. | July 25, 1939 |
| 2,180,817 | Nye | Nov. 21, 1939 |
| 2,274,603 | Herman et al. | Feb. 24, 1942 |
| 2,307,544 | Robinson | Jan. 5, 1943 |
| 2,309,983 | Riddle | Feb. 2, 1943 |
| 2,310,124 | Shartle | Feb. 2, 1943 |
| 2,324,727 | Shartle | July 20, 1943 |
| 2,328,311 | Vickers | Aug. 31, 1943 |
| 2,365,748 | Curtis | Dec. 26, 1944 |